(12) United States Patent
Kotani et al.

(10) Patent No.: US 12,271,557 B2
(45) Date of Patent: Apr. 8, 2025

(54) SENSOR CONTROL BOARD, DISPLAY APPARATUS, AND CONTROL METHOD FOR DISPLAY APPARATUS

(71) Applicant: Wacom Co., Ltd., Saitama (JP)

(72) Inventors: Yoshihiro Kotani, Saitama (JP); Kei Dobashi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/641,213

(22) Filed: Apr. 19, 2024

(65) Prior Publication Data

US 2024/0272749 A1 Aug. 15, 2024

Related U.S. Application Data

(63) Continuation of application No. 18/190,021, filed on Mar. 24, 2023, now Pat. No. 11,995,270.

(30) Foreign Application Priority Data

Mar. 28, 2022 (JP) .................. 2022-052588

(51) Int. Cl.
*G06F 3/041* (2006.01)
*G06F 3/038* (2013.01)
*G09G 3/36* (2006.01)

(52) U.S. Cl.
CPC ........ *G06F 3/04184* (2019.05); *G06F 3/0383* (2013.01); *G06F 3/0412* (2013.01); *G06F 3/04162* (2019.05); *G09G 3/3677* (2013.01); *G09G 2310/0286* (2013.01); *G09G 2320/0247* (2013.01); *G09G 2354/00* (2013.01)

(58) Field of Classification Search
None
See application file for complete search history.

(56) References Cited

U.S. PATENT DOCUMENTS

2009/0160790 A1 6/2009 Fukushima et al.
2016/0202818 A1* 7/2016 Hyun .................. G09G 3/3266
                                                              345/173
2017/0052637 A1 2/2017 Lu et al.

FOREIGN PATENT DOCUMENTS

JP          4972782 B2    7/2012

* cited by examiner

*Primary Examiner* — Carl Adams
(74) *Attorney, Agent, or Firm* — Seed IP Law Group LLP

(57) ABSTRACT

A sensor control board in a display apparatus includes a display device and a position detector, the display device including a plurality of image elements each having a first end that receives input of a common potential and a second end that receives input of an individual potential, the image elements being arrayed in a grid pattern, the position detector located either above or below the display device, the position detector detecting a pointed position on the display device, the sensor control board outputting a transmission signal to the position detector. The sensor control board includes a clock generation circuit which, in operation, generates a clock signal, and a phase adjustment circuit which, in operation, adjusts a phase of the clock signal such that the phase is inverted at each predetermined timing and output an adjusted clock signal as the transmission signal to the position detector.

11 Claims, 10 Drawing Sheets

F I G . 3
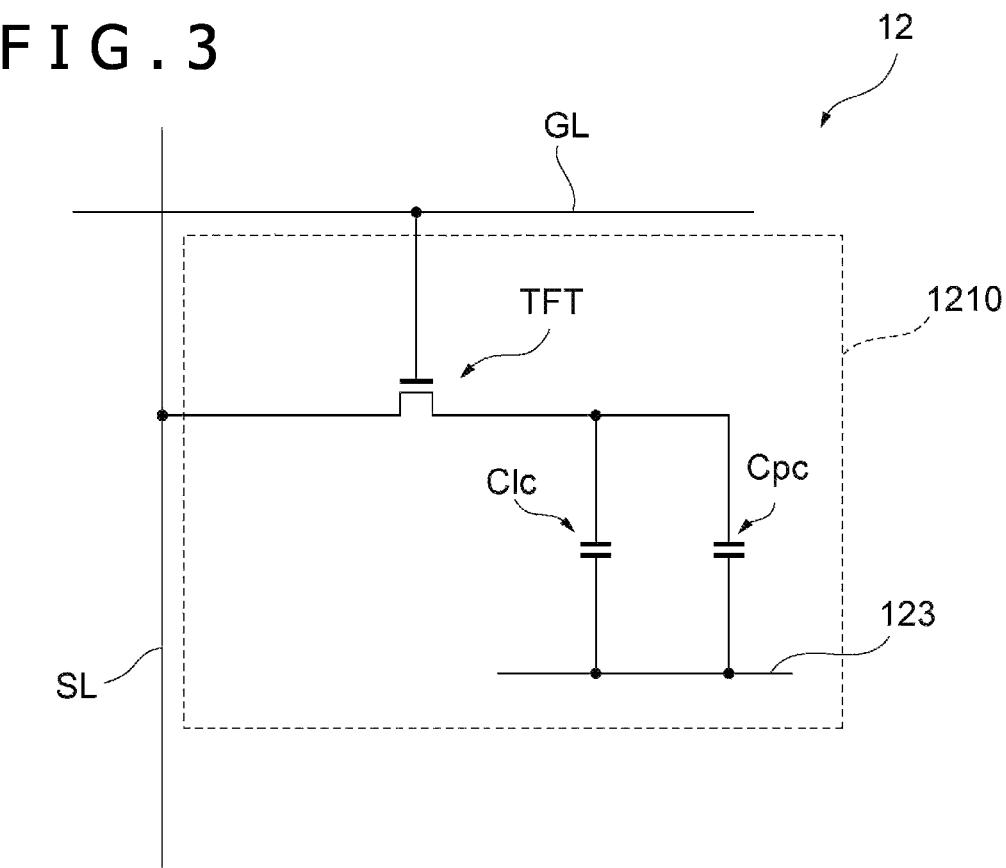

FIG.6
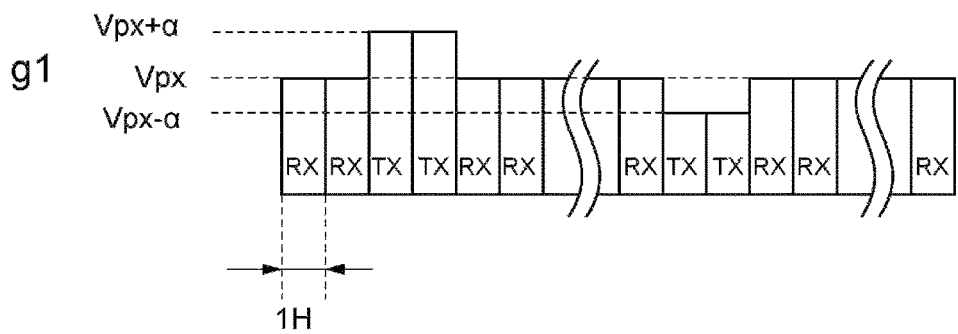
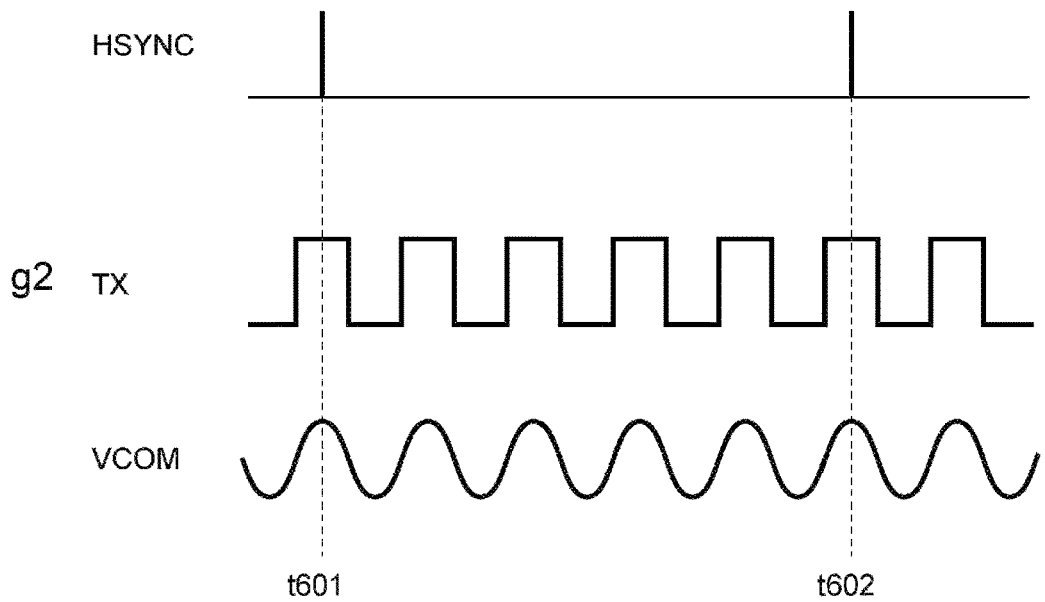
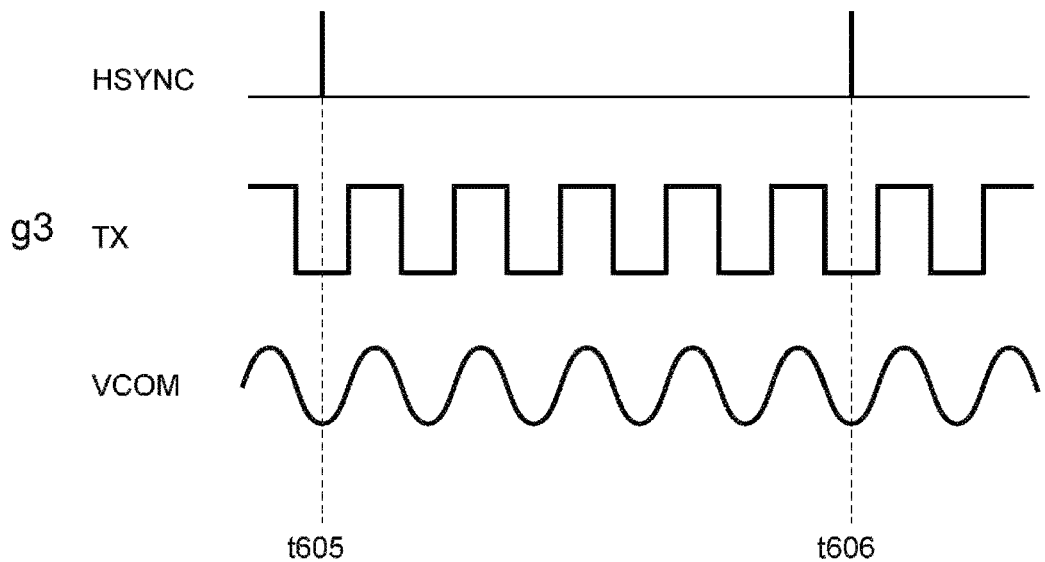

SENSOR CONTROL BOARD, DISPLAY APPARATUS, AND CONTROL METHOD FOR DISPLAY APPARATUS

BACKGROUND

Technical Field

The present disclosure relates to a sensor control board. Particularly, the disclosure relates to a sensor control board, a display apparatus, and a control method for the display apparatus.

Description of the Related Art

Heretofore, there have been known display apparatuses of which a display device such as a liquid crystal display is flat in shape. In the display device of such display apparatuses, image elements are provided at points of intersection between multiple column signal lines arrayed horizontally on one hand and multiple row signal lines arrayed vertically on the other hand. Driver circuits are further provided to electrically charge and discharge the image elements. The display apparatus displays images by causing the driver circuits to drive the row signal lines by turns and by allowing the electrical charges being fed to the column signal lines to be applied to the corresponding image elements.

In connection with the above type of display apparatus, Japanese Patent No. 4972782 (hereinafter referred to as Patent Document 1) discloses a display apparatus (display) equipped with a display device (display panel), a circuit substrate that drives the display device, and a position detector (sensor substrate) interposed between the display device and the circuit substrate so as to detect coordinates of a position pointer on the display device.

According to the technology described in Patent Document 1, there may be a case in which, at the time the position detector sends a transmission signal to the position pointer, variations in a potential of the transmission signal affect a potential of a reference line connected with the image elements. The display apparatus controls a pixel luminance of each of the image elements using the difference between the potential of the reference line and that of the column signal line supplied to each image element. The technology of Patent Document 1 thus presents a possibility that noise may be included in an image displayed by the display apparatus when the position detector sends the transmission signal to the position pointer.

BRIEF SUMMARY

The present disclosure has been made in view of the above circumstances. An object of the disclosure is therefore to provide a sensor control board that reduces the noise included in the image displayed by the display apparatus.

In solving the foregoing and other problems of the related art and according to a first aspect of the present disclosure, there is provided a sensor control board in a display apparatus that includes a display device and a position detector, the display device including a plurality of image elements each having a first end that receives input of a common potential and a second end that receives input of an individual potential, the image elements being arrayed in a grid pattern, the position detector located either above or below the display device, the position detector detecting a pointed position on the display device, the sensor control board outputting a transmission signal to the position detector. The sensor control board includes a clock generation circuit which, in operation, generates a clock signal, and a phase adjustment circuit which, in operation, adjusts a phase of the clock signal in such a manner that the phase is inverted at each predetermined timing and outputs an adjusted clock signal as the transmission signal to the position detector.

Also, according to a second aspect of the present disclosure, the sensor control board further includes an output circuit which, in operation, outputs the clock signal generated by the clock generation circuit to the phase adjustment circuit or stops outputting the clock signal to the phase adjustment circuit. The clock generation circuit is connected to the phase adjustment circuit via the output circuit, and the predetermined timing is a timing at which the output circuit outputs the clock signal to the phase adjustment circuit.

Also, according to a third aspect of the present disclosure, the sensor control board further includes an output circuit which, in operation, outputs the clock signal generated by the clock generation circuit to the phase adjustment circuit or stops outputting the clock signal to the phase adjustment circuit. The clock generation circuit is connected to the phase adjustment circuit via the output circuit. Over a plurality of third periods each made up of a first period and a plurality of second periods subsequent to and shorter than the first period, the output circuit outputs the clock signal during the first and the second periods. The predetermined timing is a timing at which the third period is started.

Also, according to a fourth aspect of the present disclosure, the predetermined timing is a timing synchronized with a vertical synchronization signal generated by the display apparatus or input to the display apparatus from the outside.

Also, according to a fifth aspect of the present disclosure, the sensor control board further includes an output circuit which, in operation, outputs the clock signal generated by the clock generation circuit to the phase adjustment circuit or stops outputting the clock signal to the phase adjustment circuit. The clock generation circuit is connected to the phase adjustment circuit via the output circuit. The output circuit alternates the clock signal at a timing synchronized with a horizontal synchronization signal generated by the display apparatus or input to the display apparatus from the outside. Over a plurality of third periods each made up of a first period and a plurality of second periods subsequent to and shorter than the first period, the output circuit outputs the clock signal during the first and the second periods.

Also, according to a sixth aspect of the present disclosure, there is provided a display apparatus including a display device including a plurality of image elements each of having a first end that receives input of a common potential and a second end that receives input of an individual potential, the image elements being arrayed in a grid pattern, a position detector located either above or below the display device and detecting a pointed position on the display device, and a sensor control board including a clock generation circuit and a phase adjustment circuit, the clock generation circuit generating a clock signal, the phase adjustment circuit adjusting a phase of the clock signal such that the phase is inverted at each predetermined timing, and outputs an adjusted clock signal as a transmission signal to the position detector.

Also, according to a seventh aspect of the present disclosure, the display apparatus further includes a timing adjustment circuit which, in operation, receives input of a horizontal synchronization signal, and outputs the horizontal synchronization signal at a timing at which a potential of the transmission signal either rises or falls, and a driver circuit which, in operation, successively drives the plurality of image elements row by row at a timing synchronized with the horizontal synchronization signal output from the timing adjustment circuit.

Also, according to an eighth aspect of the present disclosure, the timing adjustment circuit adjusts a frequency of the horizontal synchronization signal to a frequency different from a multiple of a frequency of the transmission signal, and outputs a frequency-adjusted horizontal synchronization signal at a timing at which the potential of the transmission signal either rises or falls.

Also, according to a ninth aspect of the present disclosure, the timing adjustment circuit adjusts a phase of the horizontal synchronization signal, and outputs a phase-adjusted horizontal synchronization signal at a timing at which the potential of the transmission signal either rises or falls.

Also, according to a tenth aspect of the present disclosure, there is provided a control method for a display apparatus including a display device and a position detector, the display device a plurality of image elements each having a first end that receives input of a common potential and a second end that receives input of an individual potential, the image elements being arrayed in a grid pattern, the position detector being located either above or below the display device and detecting a pointed position on the display device. The control method includes generating a clock signal, alternating the clock signal or stopping alternating the clock signal, adjusting a phase of the clock signal such that the phase is inverted at each predetermined timing, and transmitting a phase-adjusted clock signal as a transmission signal to the position detector.

The sensor control board according to the present disclosure thus reduces noise included in an image displayed by the display apparatus.

BRIEF DESCRIPTION OF THE SEVERAL VIEWS OF THE DRAWINGS

FIG. 3 is a schematic diagram depicting an example of an image element;

FIG. 6 is a first example of a timing chart depicting state transitions of a horizontal synchronization signal, a transmission signal, and a common potential;

DETAILED DESCRIPTION

Preferred embodiments for implementing the present technology (referred to as the embodiment(s)) are described below with reference to the accompanying drawings. For the purpose of easy understanding, like or corresponding constituent elements and acts are denoted by like reference signs throughout the drawings wherever it is possible to do so, and redundant descriptions of such constituent elements will be omitted.

First Embodiment

A first embodiment of the present disclosure is explained first.

Configuration

Figure 1:
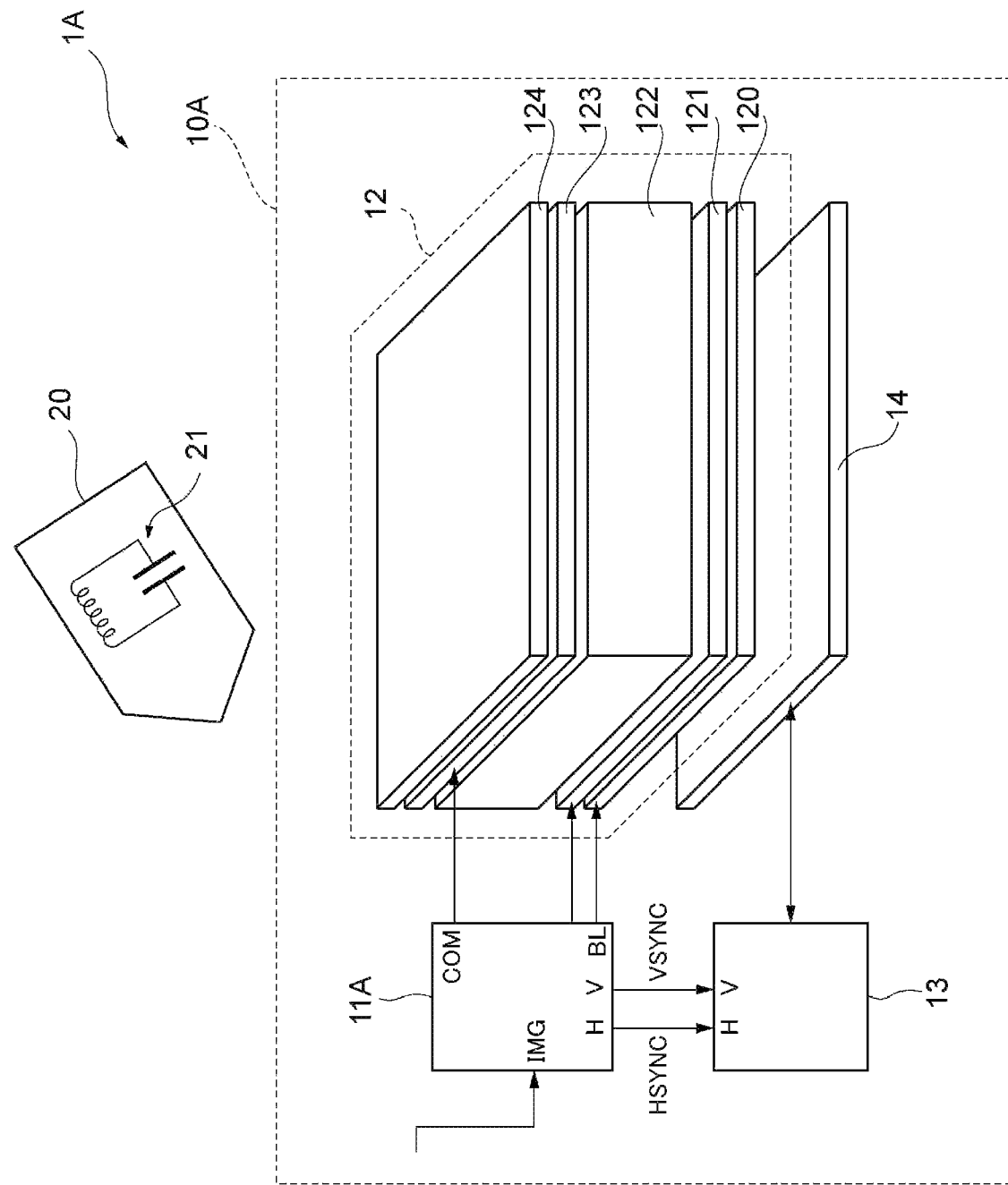
FIG. 1 is a schematic diagram depicting an example of a display system.

FIG. 1 is a schematic diagram depicting an example of a display system 1A as a first embodiment of the present disclosure. The display system 1A may be a computer, a monitor, or a television set owned by a user, for example a tablet, a smartphone, a personal computer monitor, or a television receiver. Although this example is described below regarding the case where a display apparatus 10A included in the display system 1A is a liquid crystal display, this is not limitative of how the display apparatus is implemented. Alternatively, the display apparatus 10A may be an organic electro-luminescent (EL) display, a plasma display, or some other suitable display device. The display system 1A includes the display apparatus 10A and a position pointer 20, for example.

The display apparatus 10A may be a liquid crystal display, for example. The display apparatus 10A includes a display controller 11A, a display device 12, a sensor controller 13, and a position detector 14.

The display controller 11A controls the image display of the display device 12 according to an image signal input to an image terminal IMG. The display controller 11A either generates a horizontal synchronization signal HSYNC and a vertical synchronization signal VSYNC according to the image signal, or extracts these two signals HSYNC and VSYNC included in the image signal. The display controller 11A outputs the extracted horizontal synchronization signal HSYNC and vertical synchronization signal VSYNC to the sensor controller 13 via a terminal H and a terminal V, respectively.

Under control of the display controller 11A, the display device 12 displays the image transmitted from the display controller 11A. The display device 12 includes, for example, a backlight 120, a pixel electrode 121, a liquid crystal part 122, a common electrode 123, and a color filter 124.

The backlight 120 is a light source that emits light to the pixel electrode 121 from the back thereof under control of the display controller 11A. The backlight 120 is positioned closest to the back side in the display device 12.

The pixel electrode 121, connected to one end of multiple image elements 1210 (see FIG. 2) provided in the liquid crystal part 122, supplies individual potentials to the image elements 1210. The pixel electrode 121 is positioned interposingly between the backlight 120 and the liquid crystal part 122. Under control of the display controller 11A, the pixel electrode 121 drives the individual image elements 1210 in the liquid crystal part 122.

The liquid crystal part 122 including the multiple image elements 1210 (see FIG. 2) arrayed in a grid pattern is positioned interposingly between the pixel electrode 121 and the common electrode 123. According to a potential difference applied to both ends of each image element 1210, the liquid crystal part 122 transmits or blocks the light emitted from the back light 120 per image element. In the liquid crystal part 122, one end of each image element 1210 is connected to the pixel electrode 121, and the other end thereof is connected to the common electrode 123.

The common electrode 123, connected to the other end of the multiple image elements 1210 provided in the liquid crystal part 122, uniformly supplies each image element 1210 with a common potential VCOM fed from the display controller 11A. The common electrode 123 is positioned interposingly between the liquid crystal part 122 and the color filter 124.

The color filter 124 is a filter that provides the light transmitted through the liquid crystal part 122 with color information derived from the transmission, before outputting the color information-carrying light from the display surface side. In the display device 12, the color filter 124 is located closest to the display surface side. The color filter 124 includes, for example, a glass substrate and three color resist patterns of red, green, and blue provided in grid form in upper layers of the glass substrate.

The sensor controller 13 controls the position detector 14 according to the horizontal synchronization signal HSYNC and vertical synchronization signal VSYNC input respectively to the terminal H and the terminal V from the display controller 11A. At the same time, the sensor controller 13 outputs the position on the display device 12 of the position pointer 20 detected by the position detector 14 to an external processor apparatus or to processor (not depicted).

The position detector 14 may be an electromagnetic resonance (EMR) sensor, for example. Under control of the sensor controller 13, the position detector 14 sends a transmission signal TX to the position pointer 20 and receives a resonance signal from the position pointer 20 having received the transmission signal TX, thereby detecting a given position pointed by the position pointer 20 on the display device 12. The position detector 14 includes multiple sensor coils arranged planarly on the back side of the display device 12 in a manner covering at least the range of the display surface of the display device 12 when the display system 1A is viewed from the display surface side. The position detector 14 detects the position of the sensor coil that presents the highest level of the received signal as the given position pointed by the position pointer 20 on the display device 12. The position pointer 14 further outputs information regarding the detected position to the sensor controller 13.

The position pointer 20 is a pointing device that points a given position on the display device 12. The position pointer 20 includes a resonance circuit 21 made up of an inductive element such as a coil and a capacitive element such as a capacitor. The position pointer 20 transmits to the position detector 14 the given position pointed by the position pointer 20 on the display device 12 when the resonance circuit 21 resonates with the signal transmitted from the position detector 14 and transmits the resonance signal derived from the resonance to the position detector 14.

Figure 2:
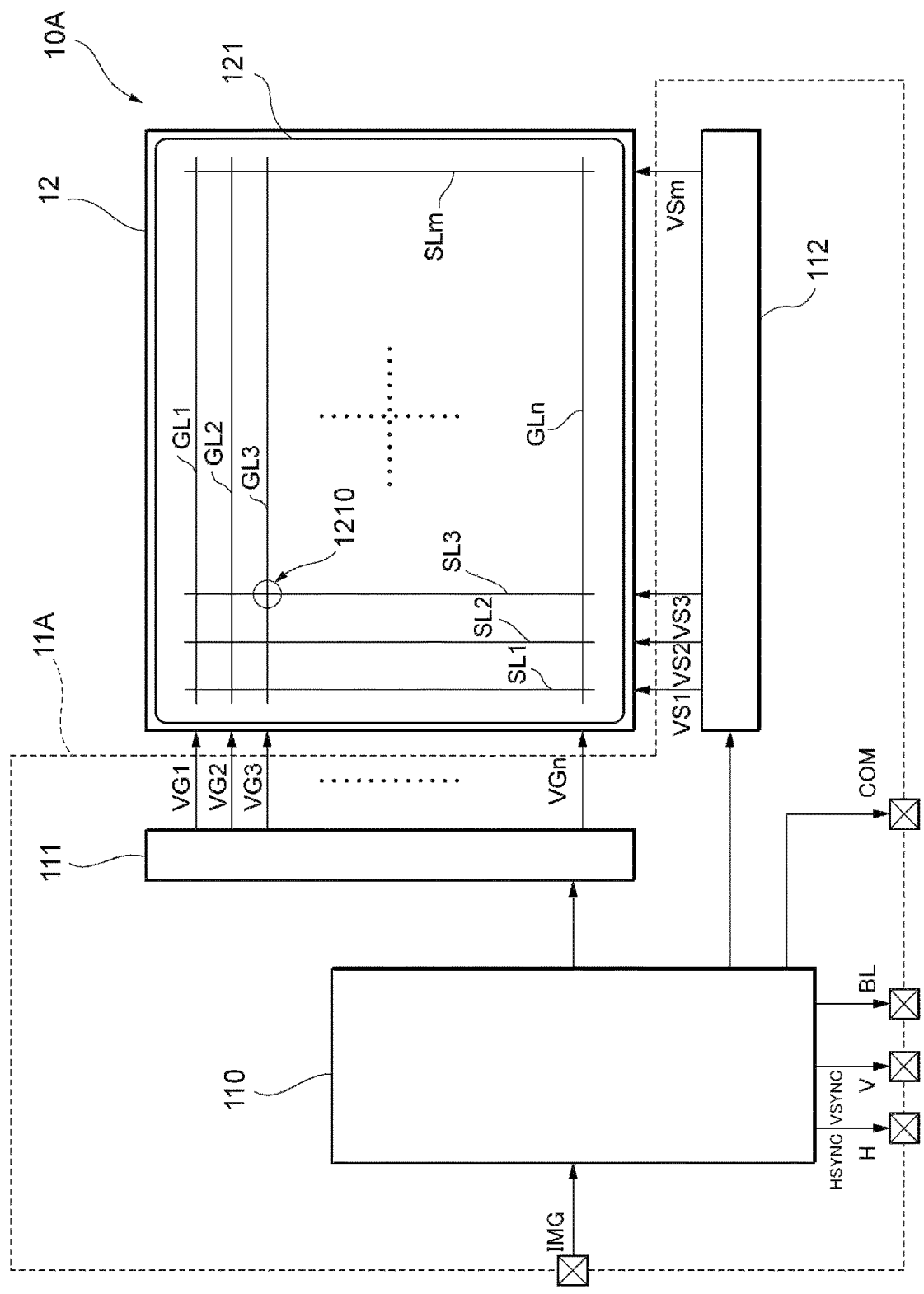
FIG. 2 is a schematic diagram depicting a first example of a circuit configuration of a display controller and a display device.

FIG. 2 is a schematic diagram depicting a first example of the circuit configuration of the display controller 11A and the display device 12. As depicted in FIG. 2, the display controller 11A is configured to include a control circuit 110, a gate driver circuit 111, and a source driver circuit 112.

The gate driver circuit 111 drives row signal lines GL1 through GLn. When the display apparatus 10A is viewed from the display surface side, the gate driver circuit 111 is located on the left side of the display device 12. Under control of the control circuit 110, the gate driver circuit 111 outputs gate signals VG1 through VGn to the corresponding row signal lines GL1 through GLn so as to drive the row signal lines GL1 through GLn by turns. Also, the gate drive circuit 111 electrically charges and discharges gate electrodes of the corresponding image elements 1210 via the row signal lines GL1 through GLn being driven.

The source driver circuit 112 drives column signal lines SL1 through SLm. When the display apparatus 10A is viewed from the display surface side, the source driver circuit 112 is located under the display device 12. In time with the control circuit 110, the source driver circuit 112 outputs source signals VS1 through VSm having their potentials set with respect to each of the column signal lines SL1 through SLm by the control circuit 110, to the corresponding column signal lines SL1 through SLm. The source driver circuit 112 supplies the potentials of the source signals VS1 through VSm to source electrodes of the corresponding image elements 1210 at the points of intersection between the row signal lines GL1 through GLn driven by the gate driver circuit 111 on one hand and the column signal lines SL1 through SLm on the other hand.

In the display device 12, the image electrode 121 includes the row signal lines GL1 through GLn arrayed vertically, the column signal lines SL1 through SLm arrayed horizontally, and the image elements 1210 arranged at the points of intersection between the row signal lines GL1 through GLn on one hand and the column signal lines SL1 through SLm on the other hand. The pixel electrode 121 drives the corresponding one of the row signal lines GL1 through GLn according to the gate signals VG1 through VGn transmitted from the gate driver circuit 111. At the same time, the pixel electrode 121 drives the image elements 1210 corresponding to the source signals VS1 through VSm indicative of the luminance defined by the source signals VS1 through VSm transmitted from the source driver circuit 112.

The row signal lines GL1 through GLn may be n gate lines, for example, which are arrayed vertically in the display apparatus 10A. The row signal lines GL1 through GLn are driven by the corresponding gate signals VG1 through VGn transmitted from the gate driver circuit 111. As such, the row signal lines GL1 through GLn relay exchanges of electrical charges between the gate electrodes of the image elements 1210 at the points of intersection with the column signal lines SL1 through SLm on one hand and the gate driver circuit 111 on the other hand.

The column signal lines SL1 through SLm may be m source lines, for example, which are arrayed horizontally in the display apparatus 10A. Driven by the corresponding source signals VS1 through VSm transmitted from the source driver circuit 112, the column signal lines SL1 through SLm relay exchanges of electrical charges between the source electrodes of the image elements 1210 at the points of intersection with the row signal lines GL1 through GLn on one hand and the source driver circuit 112 on the other hand.

The image elements 1210 may be liquid crystal image elements, for example. In the pixel electrode 121, a total of n×m image elements 1210 are arranged at the points of intersection between the row signal lines GL1 through GLn on one hand and the column signal lines SL1 through SLm on the other hand. One of the row signal lines GL1 through GLn is connected to the gate electrodes of the image elements 1210, and one of the column signal lines SL1 through SLm is connected to the source electrodes of the image elements 1210. When the image elements 1210 have their gate electrodes electrically charged via the row signal lines GL1 through GLn connected thereto, the image elements 1210 display a corresponding image with the luminance in keeping with the potentials on the column signal lines SL1 through SLm connected to the source electrodes.

The control circuit 110 is a circuit that controls the display device 12. The control circuit 110 either generates the horizontal synchronization signal HSYNC and the vertical synchronization signal VSYNC according to the image signal input via the image terminal IMG, or extracts these two signals HSYNC and VSYNC included in the image signal. The control circuit 110 outputs the horizontal synchronization signal HSYNC to the sensor controller 13 via the terminal H and the vertical synchronization signal VSYNC to the sensor controller 13 via the terminal V.

Also, in time with the vertical synchronization signal VSYNC and the horizontal synchronization signal HSYNC, the control circuit 110 controls the gate driver circuit 111 in such a manner as to drive the row signal lines GL1 through GLn by turns. The control circuit 110 further controls the source driver circuit 112 in a manner causing the image elements 1210 to display the image corresponding to the image data included in the image signal.

The control circuit 110 further generates the common potential VCOM to be applied to the common electrode 123. The control circuit 110 supplies the generated potential to the common electrode 123 via a common terminal COM. The control circuit 110 also controls the operation of the backlight 120 by transmitting thereto control signals via a backlight terminal BL.

FIG. 3 is a schematic diagram depicting an example of an image element 1210. As depicted in FIG. 3, the image element 1210 includes, for example, a thin-film transistor TFT, a liquid crystal electrode Clc, and a capacitive element Cpx.

The thin-film transistor TFT functions as a switching element in the image element 1210. In the thin-film transistor TFT, the gate electrode is connected to the row signal line GL, the source electrode is connected to the column signal line SL, and the drain electrode is connected to the liquid crystal electrode Clc and to one end of the capacitive element Cpx. When the gate electrode is electrically charged via the row signal line GL, the thin-film transistor TFT has a conductive state between the source electrode and the drain electrode. When the gate electrode is electrically discharged via the row signal line GL, the thin-film transistor TFT has a non-conductive state between the source electrode and the drain electrode. When there is no change in the potential applied to the gate electrode, the thin-film transistor TFT maintains the state between the source electrode and the drain electrode.

The liquid crystal electrode Clc is an electrode that supplies a potential to the liquid crystal part 122. One end of the liquid crystal electrode Clc is connected to the drain electrode of the thin-film transistor TFT and to one end of the capacitive element Cpx. The other end of the liquid crystal electrode Cle is connected to the common electrode 123 via the liquid crystal part 122. The liquid crystal electrode Clc supplies the liquid crystal part 122 with the potential fed from the capacitive element Cpx.

The capacitive element Cpx may be a capacitor, for example. The capacitive element Cpx holds the potential to be supplied to the liquid crystal electrode Clc. One end of the capacitive element Cpx is connected to the drain electrode of the thin-film transistor TFT and to one end of the liquid crystal electrode Clc. The other end of the capacitive element Cpx is connected to the common electrode 123. When the thin-film transistor TFT is in a conductive state, the capacitive element Cpx holds the potential supplied from the column signal line SL. When the thin-film transistor TFT is in a non-conductive state, the capacitive element Cpx supplies the potential held therein to the liquid crystal electrode Clc.

When the gate electrode of the thin-film transistor TFT is electrically charged via the row signal line GL, the image element 1210 configured as described above puts the thin-film transistor TFT in a conductive state to let the potential of the column signal line SL be supplied to the capacitive element Cpx, so that the capacitive element Cpx will hold the potential supplied via the column signal line SL. When the gate electrode of the thin-film transistor TFT is electrically discharged via the row signal line GL, the image element 1210 puts the thin-film transistor TFT in a non-conductive state to supply the liquid crystal electrode Clc with the potential being held in the capacitive element Cpx so as to control the liquid crystal part 122 in a state that complies with the supplied potential.

Figure 4:
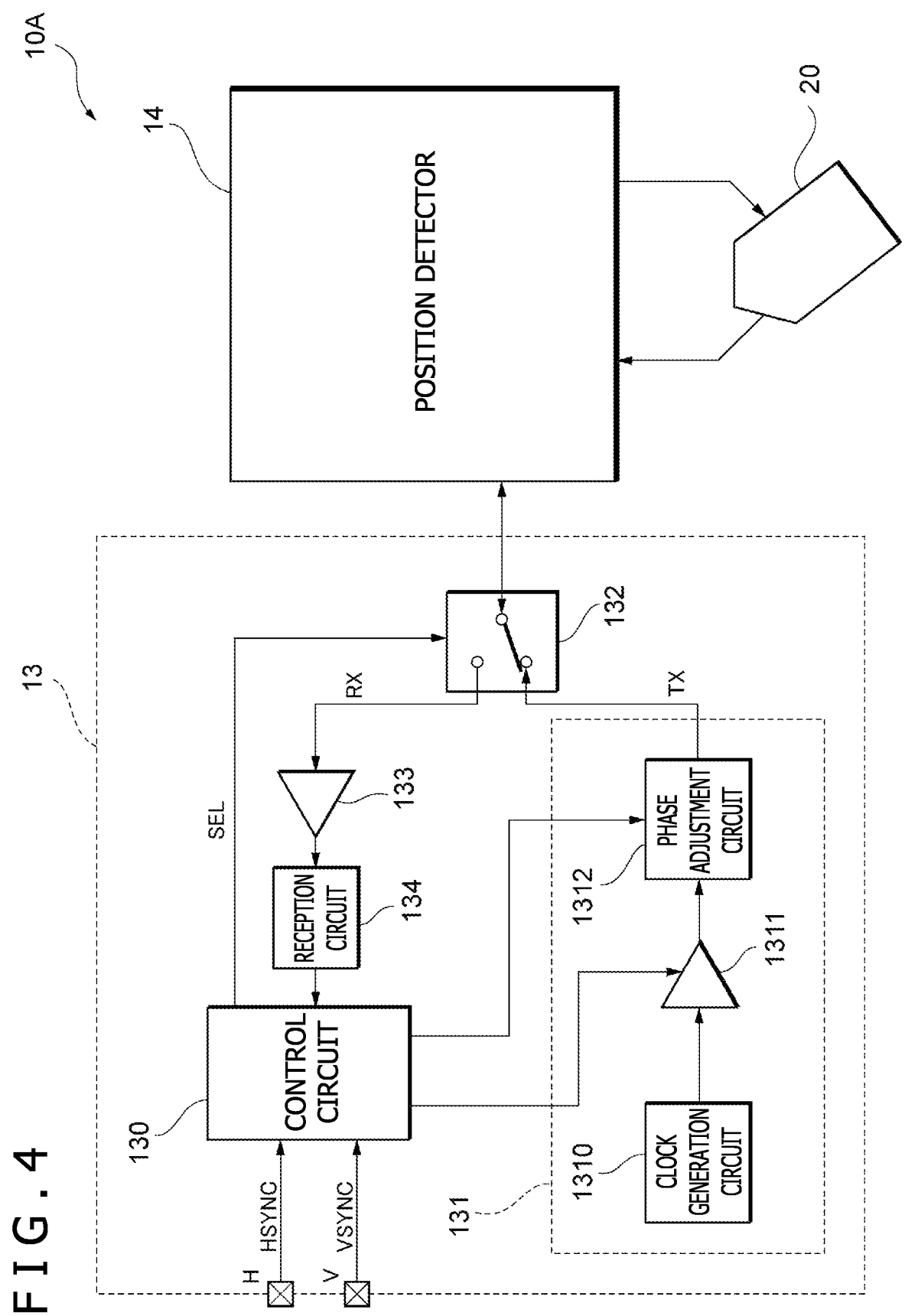
FIG. 4 is a schematic diagram depicting an example of a circuit configuration of a sensor controller and a position detector.

FIG. 4 is a schematic diagram depicting an example of the circuit configuration of the sensor controller 13 and the position detector 14. As depicted in FIG. 4, the sensor controller 13 includes a control circuit 130, a sensor control board 131, a switching circuit 132, an amplification circuit 133, and a reception circuit 134.

The control circuit 130 controls the sensor control board 131 and the switching circuit 132 according to the horizontal synchronization signal HSYNC and the vertical synchronization signal VSYNC which are output from the display controller 11A. At the same time, the control circuit 130 outputs a signal indicative of position information regarding a position of the position pointer 20 on the display device 12 to an external processor apparatus or to processor (not depicted), the position information being output from the reception circuit 134.

Specifically, during the period from a point in time at which the vertical synchronization signal VSYNC alternates to a point in time at which the vertical synchronization signal VSYNC again alternates, the control circuit 130 controls the sensor control board 131 and the switching circuit 132 to let the position detector 14 detect the position of the position pointer 20 multiple times (scan process). The control circuit 130 controls the switching circuit 132 by outputting a selection signal SEL thereto. Here, the control circuit 130 performs a burst process, a data transmission and reception process, and a coordinate process by turns during a scan period SCAN in which the scan process is carried out once.

The control circuit 130 performs the burst process during a burst period "burst" constituting a first period in the scan period SCAN. Here, the burst process is a process in which the position detector 14 sends the transmission signal TX continuously to the position pointer 20 so as to accumulate energy in the resonance circuit 21 provided in the position pointer 20. In the burst process, the control circuit 130 controls the sensor control board 131 and the switching circuit 132 in a manner causing the transmission signal TX to be continuously transmitted to the position detector 14. Incidentally, the burst period "burst" is longer than a data period "data" in which the data transmission and reception process is carried out or than a coordinate period "coord" in which the coordinate process is performed following the burst period "burst."

The control circuit 130 performs the data transmission and reception process during the data period "data" next to the burst period "burst" in the scan period SCAN. Here, the data transmission and reception process is a process in which the position detector 14 and the position pointer 20 send and receive, for example, a unique identification (ID) of the position pointer 20 therebetween. According to the selection signal SEL, the control circuit 130 switches the connection destination of the switching circuit 132 either to the amplification circuit 133 or to a phase adjustment circuit 1312. As a result, the control circuit 130 alternately transmits the transmission signal TX to the position detector 14 and receives a reception signal RX from the position detector 14.

The control circuit 130 performs the coordinate process in the coordinate period "coord" next to the data period "data" in the scan period SCAN. Here, the coordinate process is a process of detecting the position (coordinates) of the position pointer 20 on the display device 12. According to the selection signal SEL, the control circuit 130 switches the connection destination of the switching circuit 132 either to the amplification circuit 133 or to the phase adjustment circuit 1312. As a result, the control circuit 130 alternately transmits the transmission signal TX to the position detector 14 and receives the reception signal RX from the position detector 14.

Also, the control circuit 130 controls the timing of an output circuit 1311 for outputting a clock signal in a manner synchronized with the horizontal synchronization signal HSYNC during the data period "data" and the coordinate period "coord." Further, while the switching circuit 132 is being connected with the amplification circuit 133, the control circuit 130 controls the output circuit 1311 to stop outputting the clock signal. On the other hand, while the switching circuit 132 is being connected with the phase adjustment circuit 1312, the control circuit 130 controls the output circuit 1311 to output the clock signal.

The control circuit 130 also controls the phase adjustment circuit 1312 in such a manner that the phase of the clock signal output from the output circuit 1311 is inverted at each predetermined timing. The predetermined timing is, for example, a timing at which the output circuit 1311 outputs the clock signal to the phase adjustment circuit 1312, a timing at which the scan period SCAN is started, or a timing synchronized with the vertical synchronization signal VSYNC (specifically, a timing at which the vertical synchronization signal VSYNC is alternated).

Under control of the control circuit 130, the sensor control board 131 generates the transmission signal TX for driving the position detector 14 when the position detector 14 transmits its signal to the position pointer 20. The sensor control board 131 transmits the generated transmission signal TX to the position detector 14 via the switching circuit 132. The sensor control board 131 includes, for example, a clock generation circuit 1310, the output circuit 1311, and the phase adjustment circuit 1312.

The clock generation circuit 1310 may be an oscillator, for example. The clock generation circuit 1310 generates a clock signal with a frequency equal to the resonance frequency of the resonance circuit 21 in the position pointer 20. The clock generation circuit 1310 outputs the generated clock signal to the output circuit 1311.

The output circuit 1311 may be a current driver, for example. Under control of the control circuit 130, the output circuit 1311 either outputs the clock signal from the clock generation circuit 1310 to the phase adjustment circuit 1312 or stops outputting the clock signal. At the time of clock signal output, the output circuit 1311 under control of the control circuit 130 outputs the clock signal at a timing synchronized with the horizontal synchronization signal HSYNC during the data period "data" and the coordinate period "coord."

Under control of the control circuit 130, the phase adjustment circuit 1312 adjusts the phase of the clock signal output from the output circuit 1311 in such a manner that the phase is inverted at each predetermined timing. Some specific examples of the predetermined timing have been mentioned above. The phase adjustment circuit 1312 outputs the phase-adjusted clock signal as the transmission signal TX to the position detector 14 via the switching circuit 132.

The switching circuit 132 is connected to the control circuit 130, amplification circuit 133, phase adjustment circuit 1312, and position detector 14. Under control of the control circuit 130, the switching circuit 132 switches the connection destination of the position detector 14 either to the amplification circuit 133 or to the phase adjustment circuit 1312. Specifically, according to the selection signal SEL output from the control circuit 130, the switching circuit 132 switches the connection destination of the position detector 14 either to the amplification circuit 133 or to the phase adjustment circuit 1312.

The amplification circuit 133 may be an operational amplifier, for example. The amplification circuit 133 amplifies the signal indicative of position information regarding the position of the position pointer 20, the signal being supplied from the position detector 14 via the switching circuit 132. The amplification circuit 133 outputs the amplified signal to the reception circuit 134.

The reception circuit 134 performs predetermined processes on the signal supplied from the position detector 14 via the switching circuit 132 and amplification circuit 133, the signal being indicative of the position information regarding the position of the position pointer 20. The reception circuit 134 outputs the signal thus processed to the control circuit 130. Specifically, given the signal from the position detector 14 via the amplification circuit 133, the signal indicating the position information regarding the position pointer 20, the reception circuit 134 reduces the high-frequency component of the signal by use of a low-pass filter. The reception circuit 134 then converts the signal to a digital signal by use of an analog-digital converter circuit. The reception circuit 134 outputs the signal in digital form to the control circuit 130.

The position detector 14 drives each of the sensor coils according to the transmission signal TX output from the sensor control board 131 via the switching circuit 132, and transmits the transmission signal TX to the position pointer 20. Also, the position detector 14 receives the reception signal RX transmitted from the position pointer 20 by use of the sensor coils. The position detector 14 then transmits the reception signal RX to the amplification circuit 133 via the switching circuit 132.

Flow of Series of Operations

Figure 5:
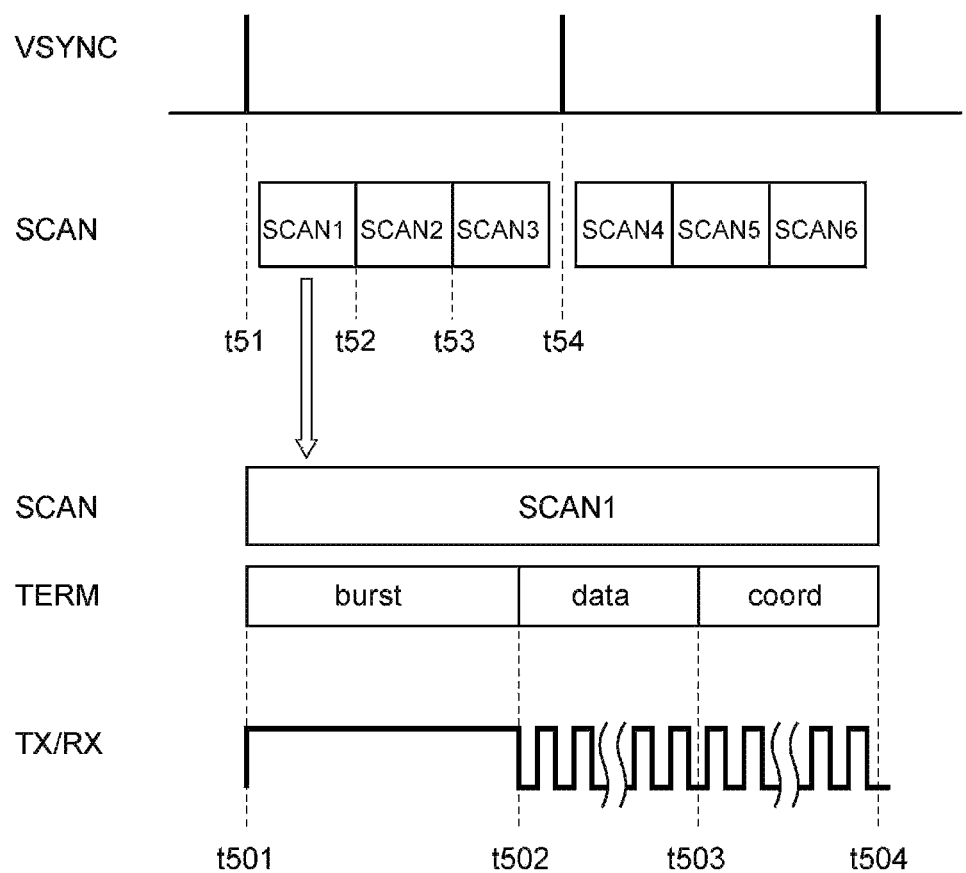
FIG. 5 is an example of a timing chart depicting state transitions of a vertical synchronization signal and a transmission signal.

The configuration of the display system 1A has been discussed above. What follows is a detailed explanation of the potential transitions of signals in the display system 1A. FIG. 5 is an example of a timing chart depicting state transitions of the vertical synchronization signal VSYNC and the transmission signal TX in the display system 1A as the first embodiment.

At time t51, the control circuit 110 of the display controller 11A alternates the vertical synchronization signal VSYNC. When the above-mentioned predetermined timing is a timing synchronized with the vertical synchronization signal VSYNC, the control circuit 130 controls the phase adjustment circuit 1312 to invert the phase of the clock signal.

At time t501, the control circuit 130 of the sensor controller 13 starts a first scan process. At time t501, the control circuit 130 first starts the burst period "burst," and switches the connection destination of the switching circuit 132 to the phase adjustment circuit 1312. At the same time, the control circuit 130 transmits the transmission signal TX from the output circuit 1311 to the position detector 14 via the phase adjustment circuit 1312 and switching circuit 132. When the above-mentioned predetermined timing is a timing at which the scan period SCAN is started, the control circuit 130 controls the phase adjustment circuit 1312 to invert the phase of the clock signal.

During the burst period "burst" from time t501 to time t502, the position detector 14 transmits the transmission signal TX to the position pointer 20. During the burst period "burst" between time t501 and time t502, the position pointer 20 receives the transmission signal TX from the position detector 14 so as to accumulate energy in the resonance circuit 21.

At time t502, the control circuit 130 terminates the burst period "burst" and starts the data period "data." During the data period "data" from time t502 to time t503, the control circuit 130 switches the connection destination of the switching circuit 132 either to the amplification circuit 133 or to the phase adjustment circuit 1312. As a result, the control circuit 130 alternately transmits the transmission signal TX to the position detector 14 and receives the reception signal RX from the position detector 14. When the above-mentioned predetermined timing is a timing at which the output circuit 1311 outputs the clock signal to the phase adjustment circuit 1312, the control circuit 130 controls the phase adjustment circuit 1312 to invert the phase of the clock signal every time the transmission signal TX starts to be transmitted to the position detector 14. During the data period "data" from time t502 to time t503, the position detector 14 alternately transmits the transmission signal TX to the position pointer 20 and receives the reception signal RX transmitted from the position pointer 20. Also during the data period "data" between time t502 and time t503, the position pointer 20 transmits the reception signal RX to the position detector 14 according to the transmission signal TX transmitted from the position detector 14.

At time t503, the control circuit 130 terminates the data period "data" and starts the coordinate period "coord." During the coordinate period "coord" from time t503 to time t504, the control circuit 130 switches the connection destination of the switching circuit 132 either to the amplification circuit 133 or to the phase adjustment circuit 1312. As a result, the control circuit 130 alternately transmits the transmission signal TX to the position detector 14 and receives the reception signal RX from the position detector 14. Also during the coordinate period "coord" between time t503 and time t504, the control circuit 130 identifies the position of the position pointer 20 on the display device 12 according to the reception signal RX. The control circuit 130 then outputs a signal indicative of position information regarding the identified position to an external processor apparatus or to processor (not depicted). When the above-mentioned predetermined timing is a timing at which the output circuit 1311 outputs the clock signal to the phase adjustment circuit 1312, the control circuit 130 controls the phase adjustment circuit 1312 to invert the phase of the clock signal every time the transmission signal TX starts to be transmitted to the position detector 14. During the data period "data" from time t503 to time t504, the position detector 14 alternately transmits the transmission signal TX to the position pointer 20 and receives the reception signal RX from the position pointer 20. Also during the data period "data" between time t503 and time t504, the position pointer 20 transmits the reception signal RX to the position detector 14 according to the transmission signal TX transmitted from the position detector 14.

At time t504, the control circuit 130 terminates the coordinate period "coord" and ends the first scan process.

At time t52 and time t53, the control circuit 130 performs a second scan process and a third scan process, respectively, as at time t51. When the above-mentioned predetermined timing is a timing at which the scan period SCAN is started, the control circuit 130 adjusts the phase adjustment circuit 1312 to invert the phase of the clock signal.

At time t54, the control circuit 110 of the display controller 11A alternates the vertical synchronization signal VSYNC. When the above-mentioned predetermined timing is a timing synchronized with the vertical synchronization signal VSYNC, the control circuit 130 adjusts the phase adjustment circuit 1312 to invert the phase of the clock signal. From time t54 on, the display system 1A performs processes similar to those carried out starting from time t51.

FIG. 6 is an example of a timing chart depicting state transitions of the horizontal synchronization signal HSYNC, transmission signal TX, and common potential VCOM in the display system 1 as the first embodiment.

A graph g1 in the drawing indicates the potential differences applied to both ends of the image element 1210 during the data period "data" or during the coordinate period "coord." In the graph g1, a period 1H indicates one cycle of the horizontal synchronization signal HSYNC. Graphs g2 and g3 each indicate the potentials of the horizontal synchronization signal HSYNC, transmission signal TX, and common potential VCOM, the phases of the transmission signal TX being opposite to each other between the two graphs g2 and g3. As depicted in the graphs g2 and g3, the common potential VCOM, which is the potential of the common electrode 123, varies in keeping with the potential of the transmission signal TX under the influence of the transmission signal TX flowing through the position detector 14 located below the common electrode 123.

In reference to the graph g2, the control circuit 110 of the display controller 11A alternates the horizontal synchronization signal HSYNC at time t601 and time t602. Also at time t601 and time t602, the potential of the transmission signal TX is at a high level. At time t601 and time t602, the common potential VCOM increases by an amount of α under the influence of the potential of the transmission signal TX flowing through the position detector 14.

In reference to the graph g3, the control circuit 110 of the display controller 11A alternates the horizontal synchronization signal HSYNC at time t605 and time t606. Also at time t605 and time t606, the potential of the transmission signal TX is at a low level. At time t605 and time t606, the common potential VCOM decreases by the amount of α under the influence of the potential of the transmission signal TX flowing through the position detector 14.

In reference to the graph g1, during the period in which the sensor controller 13 stops transmitting the transmission signal TX to the position detector 14 while receiving the reception signal RX transmitted from the position pointer 20 via the position detector 14, a potential difference Vpx is applied to both ends of the pixel element 1210. During the period in which the sensor controller 13 transmits the transmission signal TX to the position detector 14, a potential difference Vpx+α or Vpx−α is applied to both ends of the image element 1210 according to the variation in the potential of the common electrode 123 connected to one end of the pixel element 1210. The potential difference applied to both ends of the image element 1210 becomes approximately equal to Vpx on average because the phase of the transmission signal TX is inverted by the control circuit 130 at each predetermined timing.

Figure 7:
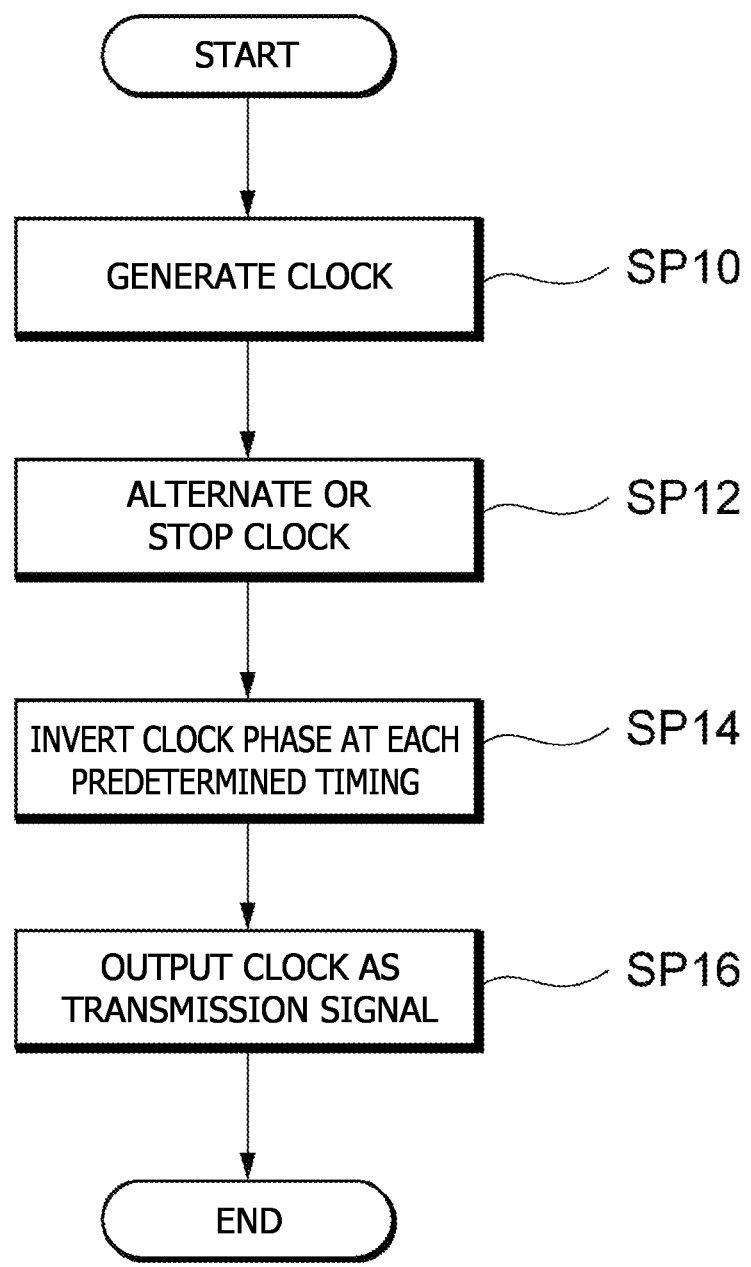
FIG. 7 is a flowchart depicting an exemplary flow of operations performed by the display system.

The potential transitions of the signals in the display system 1A have been discussed above. What follows is a detailed explanation of a flow of processes performed by the display system 1A. FIG. 7 is a flowchart depicting an exemplary flow of processes carried out by the display system 1A as the first embodiment.

SP10

The display apparatus 10A causes the clock generation circuit 1310 to generate the clock signal. The display apparatus 10A outputs the clock signal generated by the clock generation circuit 1310 to the output circuit 1311. Control is then transferred to the process of SP12.

SP12

The display apparatus 10A causes the control circuit 130 of the sensor controller 13 to control the output circuit 1311 outputting the clock signal. During the burst period "burst," the display apparatus 10A causes the output circuit 1311 to output the clock signal. During the data period "data" and coordinate period "coord," the display apparatus 10A controls the output circuit 1311 to alternately output and stop the clock signal. Control is then transferred to the process of SP14.

SP14

The display apparatus 10A controls the phase adjustment circuit 1312 to allow the control circuit 130 of the sensor controller 13 to invert the phase of the clock signal at each predetermined timing. As discussed above, the predetermined timing is a timing at which the output circuit 1311 outputs the clock signal to the phase adjustment circuit 1312, a timing at which the scan period SCAN is started, or a timing synchronized with the vertical synchronization signal VSYNC. Control is then transferred to the process of SP16.

SP16

The display apparatus 10A causes the position detector 14 to output to the position pointer 20 the clock signal with its phase adjusted by the phase adjustment circuit 1312 as the transmission signal TX. This terminates the flow of processes depicted in FIG. 7.

Effects

Also, in the above-described first embodiment, the display apparatus 10A further includes the display device 12 and the position detector 14. The display device 12 includes multiple image elements 1210, each of which has one end thereof receiving input of the common potential VCOM and the other end thereof receiving input of the corresponding one of individual potentials (any one of individualized potentials of the source signals VS1 through VSm). The position detector 14, located above or below the display device 12, detects the position pointed on the display device 12. In the display apparatus 10A, the sensor control board 131 outputs the transmission signal TX to the position detector 14. The sensor control board 131 includes the clock generation circuit 1310 and the phase adjustment circuit 1312. The clock generation circuit 1310 generates the clock signal. The phase adjustment circuit 1312 performs phase adjustment to invert the phase of the clock signal at each predetermined timing. In addition, the phase adjustment circuit 1312 further outputs the phase-adjusted clock signal to the position detector 14 as the transmission signal TX.

In the above-described configuration, the sensor control board 131 inverts the phase of the clock signal at each predetermined timing. The sensor control board 131 thus cancels out the variation in the common potential VCOM under the influence of the potential variation of the transmission signal TX, thereby reducing the noise included in the image displayed by the display apparatus 10A.

In the first embodiment, the sensor control board 131 includes the output circuit 1311 that either outputs the clock signal generated by the clock generation circuit 1310 to the phase adjustment circuit 1312, or stops outputting the clock signal to the phase adjustment circuit 1312. Here, the clock generation circuit 1310 is connected to the phase adjustment circuit 1312 via the output circuit 1311. The predetermined timing is a timing at which the output circuit 1311 outputs the clock signal to the phase adjustment circuit 1312.

In the above configuration, the sensor control board 131 inverts the phase of the clock signal every time the output circuit 1311 outputs the clock signal. This makes it possible to reduce more accurately the noise included in the image displayed by the display apparatus 10A.

Also, with the first embodiment, over multiple third periods (scan periods SCAN) each made up of a first period (burst period "burst") and multiple second periods (data period "data" and coordinate period "coord") subsequent to and shorter than the first period, the output circuit 1311 outputs the clock signal during the first and the second periods. Also, the predetermined timing is a timing at which the third period is started.

In the above configuration, the sensor control board 131 inverts the phase of the clock signal every time the scan period SCAN is started. This makes it possible to reduce the noise included in the image displayed by the display apparatus 10A, regardless of the specifications regarding the signal transmission and reception executed during the scan period.

In the first embodiment, the predetermined timing is a timing synchronized with the vertical synchronization signal VSYN either generated by the display apparatus 10A or input thereto from the outside.

In the above configuration, the sensor control board 131 inverts the phase of the clock signal at a timing synchronized with the vertical synchronization signal VSYNC. This makes it possible to reduce the noise included in the image displayed by the display apparatus 10A, regardless of the specifications regarding the signal transmission and reception between the position detector 14 and the position pointer 20.

Second Embodiment

A second embodiment of the present disclosure is then described below.

Configuration

Figure 8:
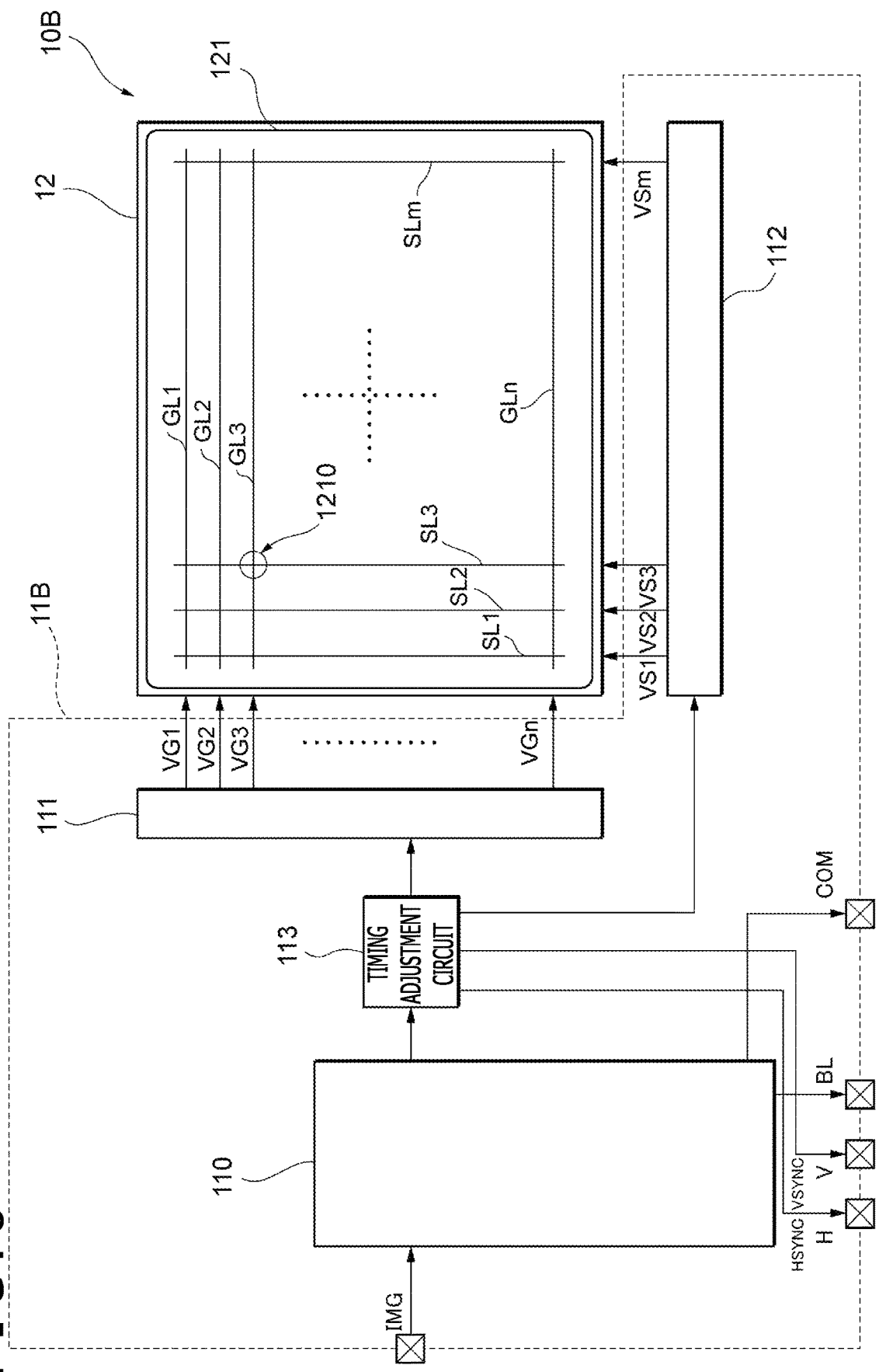
FIG. 8 is a schematic diagram depicting a second example of the circuit configuration of the display controller and the display device.

FIG. 8 is a schematic diagram depicting a circuit configuration of a display controller 11B and a display device 12 in a display system 1B as the second embodiment. Also, the display system 1B is similar to the display system 1A of the first embodiment except that a timing adjustment circuit 113 is added to the display controller 11B in a display apparatus 10B. Descriptions of like or corresponding constituent elements are thus omitted below.

The control circuit 110 outputs the horizontal synchronization signal HSYNC and vertical synchronization signal VSYNC either extracted from the image signal or generated, to the gate driver circuit 11 and to the source driver circuit 112 by way of the timing adjustment circuit 113.

The timing adjustment circuit 113 receives the horizontal synchronization signal HSYNC from the control circuit 110. At a timing at which the potential of the transmission signal TX transmitted from the sensor controller 13 to the position detector 14 either rises or falls, the timing adjustment circuit 113 outputs the received horizontal synchronization signal HSYNC to the gate driver circuit 111, the source driver circuit 112, and the sensor controller 13. Also, the timing adjustment circuit 113 adjusts the timing for outputting the vertical synchronization signal VSYNC in keeping with the adjusted output timing of the horizontal synchronization signal HSYNC. The timing adjustment circuit 113 outputs the vertical synchronization signal VSYNC adjusted in output timing to the gate driver circuit 111, the source driver circuit 112, and the sensor controller 13.

Specifically, given the horizontal synchronization signal HSYNC with a frequency of 133 kHz from the control circuit 110, the timing adjustment circuit 113 adjusts the frequency of the received signal to a frequency (e.g., 130 kHz) different from a multiple of the frequency (e.g., 666 kHz) of the transmission signal TX. The timing adjustment circuit 113 outputs the frequency-adjusted horizontal synchronization signal HSYNC to the gate driver circuit 111 at a timing at which the potential of the transmission signal TX either rises or falls.

Alternatively, given the horizontal synchronization signal HSYNC from the control circuit 110, the timing adjustment circuit 113 adjusts the phase of the received signal. The timing adjustment circuit 113 then outputs the phase-adjusted horizontal synchronization signal HSYNC to the gate driver circuit 111 at a timing at which the potential of the transmission signal TX either rises or falls.

Flow of Series of Operations

Figure 9:
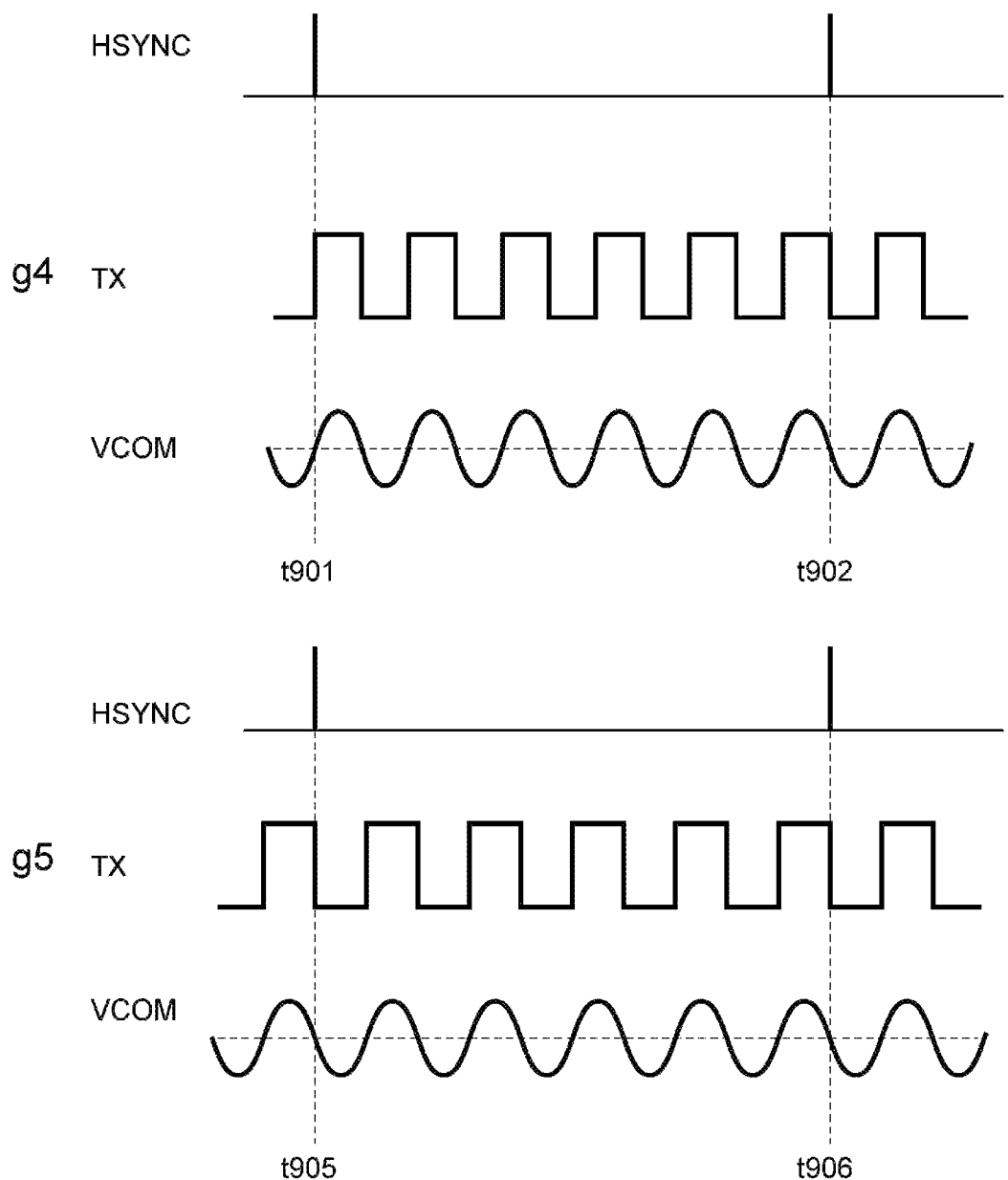
FIG. 9 is a second example of the timing chart depicting state transitions of the horizontal synchronization signal, the transmission signal, and the common potential.

The configuration of the display system 1B has been explained above. What follows is a detailed explanation of the potential transitions of the signals in the display system 1B. FIG. 9 is another example of the timing chart depicting the state transitions of the horizontal synchronization signal HSYNC, the transmission signal TX, and the common potential VCOM in the display system 1B as the second embodiment.

A graph g4 in the drawing applies to the case where the frequency of the horizontal synchronization signal HSYNC is adjusted to a frequency different from a multiple of the frequency of the transmission signal TX. A graph g5 applies to the case where the phase of the horizontal synchronization signal HSYNC is advanced by a quarter of one cycle of the horizontal synchronization signal HSYNC.

In reference to the graph g4, the control circuit 110 of the display controller 11B alternates the horizontal synchronization signal HSYNC at time t901 and time t902. Also, at time t901, the control circuit 130 of the sensor controller 13 causes the potential of the transmission signal TX to rise. Moreover, at time t902, the control circuit 130 of the sensor controller 13 causes the potential of the transmission signal TX to fall. At time t901 and time t902, the common potential VCOM transitions continuously from low to high level or from high to low level. The common potential VCOM thus becomes approximately equal to the potential supplied from the control circuit 110 to the common electrode 123.

In reference to the graph g5, the control circuit 110 of the display controller 11B alternates the horizontal synchronization signal HSYNC at time t905 and time t906. Also, at time t905 and time t906, the control circuit 130 of the sensor controller 13 causes the potential of the transmission signal TX to fall. At time t905 and time t906, the common potential VCOM transitions continuously from high to low level. The common potential VCOM thus becomes approximately equal to the potential supplied from the control circuit 110 to the common electrode 123.

Effects

In the above-described second embodiment, the display apparatus 10B includes the display device 12, the position detector 14, and the sensor control board 131. The display device 12 includes multiple image elements 1210, each of which has one end thereof receiving input of the common potential VCOM and the other end thereof receiving input of the corresponding one of individual potentials (any one of individualized potentials of the source signals VS1 through VSm). The position detector 14, located above or below the display device 12, detects the position pointed on the display device 12. The sensor control board 131 generates the transmission signal TX, and outputs the generated transmission signal TX to the position detector 14. The display apparatus 10B further includes the timing adjustment circuit 113 and the gate driver circuit 111 (driver circuit). The timing adjustment circuit 113 receives input of the horizontal synchronization signal HSYNC either generated by the display device 12 or input to the display apparatus 10B from the outside, and outputs the horizontal synchronization signal HSYNC at a timing at which the potential of the transmission signal TX either rises or falls. The gate driver circuit 111 drives the multiple image elements 1210 row by row by turns at a timing synchronized with the horizontal synchronization signal HSYNC output from the timing adjustment circuit 113.

In addition, in the above-described configuration, the display apparatus 10B outputs the horizontal synchronization signal HSYNC from the timing adjustment circuit 113 to the gate driver circuit 111 at a timing at which the potential of the transmission signal TX either rises or falls. This makes it possible to inhibit the variation in the common potential VCOM at each timing at which the image element 1210 is driven. As a result, the display apparatus 10B can reduce the noise included in the image displayed by the display apparatus 10B, the noise being attributable to the variation in the common potential VCOM stemming from the variation in the transmission signal TX.

In the second embodiment, the timing adjustment circuit 113 adjusts the frequency of the horizontal synchronization signal HSYNC to a frequency different from a multiple of the frequency of the transmission signal TX. The timing adjustment circuit 113 then outputs the frequency-adjusted horizontal synchronization signal HSYNC at a timing at which the potential of the transmission signal TX either rises or falls.

In the above configuration, the display apparatus 10B need only have the timing adjustment circuit 113 added to adjust the frequency of the horizontal synchronization signal HSYNC so as to reduce the noise included in the image displayed by the display apparatus 10B, the noise being attributable to the variation in the common potential VCOM stemming from the variation in the transmission signal TX.

Also in the second embodiment, the timing adjustment circuit 113 adjusts the phase of the horizontal synchronization signal HSYNC so as to output the phase-adjusted horizontal synchronization signal HSYNC at a timing at which the potential of the transmission signal TX either rises or falls.

In the above configuration, the display apparatus 10B need only have the timing adjustment circuit 113 added to adjust the phase of the horizontal synchronization signal HSYNC in order to reduce the noise included in the image displayed by the display apparatus 10B, the noise being attributable to the variation in the common potential VCOM stemming from the variation in the transmission signal TX.

Third Embodiment

A third embodiment of the present disclosure is then described below.

Flow of Operations

The third embodiment differs from the first embodiment in terms of the method of control over the output circuit 1311 by the control circuit 130 in the sensor control board 131. The remaining points are similar to those of the display system 1A in the first embodiment, so that descriptions of like or corresponding constituent elements are omitted below.

Figure 10:
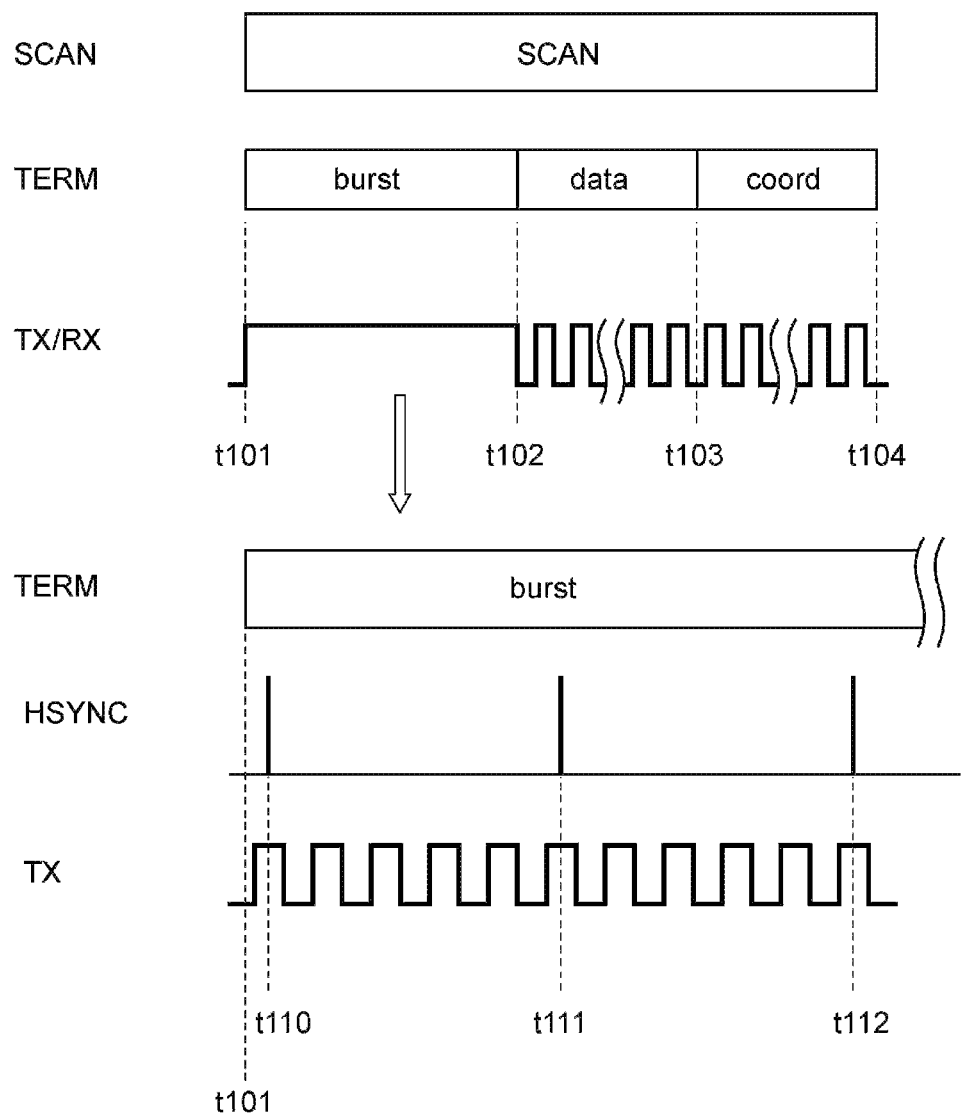
FIG. 10 is a third example of the timing chart depicting state transitions of the horizontal synchronization signal and transmission signal.

FIG. 10 is another example of the timing chart depicting state transitions of the horizontal synchronization signal HSYNC and the transmission signal TX in the display apparatus 10 of the third embodiment.

At time t101, the control circuit 130 of the sensor controller 13 starts the scan process. At time t101, the control circuit 130 first starts the burst period "burst," and switches the connection destination of the switching circuit 132 to the phase adjustment circuit 1312. At the same time, the control circuit 130 transmits the transmission signal TX from the output circuit 1311 to the position detector 14 via the phase adjustment circuit 1312 and the switching circuit 132.

At time t110 through time t112, the control circuit 110 of the display controller 11A alternates the horizontal synchronization signal HSYNC. Also, during the burst period "burst" from time t110 to time t112, the output circuit 1311 under control of the control circuit 130 outputs the clock signal to the phase adjustment circuit 1312 in a manner synchronized with the horizontal synchronization signal HSYNC.

The period from time t102 to time t103 is the data period "data." Also, the period from time t103 to time t104 is the coordinate period "coord." The processes performed during the data period "data" and the coordinate period "coord" are similar to those of the first embodiment and thus will not be discussed further.

Effects

In the above-described third embodiment, the display apparatus 10 includes the display device 12 and the position detector 14. The display device 12 includes the multiple image elements 1210, each of which has one end thereof receiving input of the common potential VCOM and the other end thereof receiving input of the corresponding one of individual potentials (any one of individualized potentials of the source signals VS1 through VSm). The position detector 14, located above or below the display device 12, detects the position pointed on the display device 12. In the display apparatus 10, the sensor control board 131 outputs the transmission signal TX to the position detector 14. Also, the sensor control board 131 further includes the clock generation circuit 1310 and the output circuit 1311. The clock generation circuit 1310 generates the clock signal. The output circuit 1311 either outputs the clock signal generated by the clock generation circuit 1310 to the position detector 14, or stops outputting the clock signal to the position detector 14. In the sensor control board 131, the output circuit 1311 further alternates the clock signal at a timing synchronized with the horizontal synchronization signal HSYNC either generated by the display apparatus 10 or input thereto from the outside. Over multiple third periods (scan periods SCAN) each made up of a first period (burst period "burst") and multiple second periods (data period "data" and coordinate period "coord") subsequent to and shorter than the first period, the output circuit 1311 outputs the clock signal to the position detector 14 during the first and the second periods.

In the above-described configuration, the sensor control board 131 synchronizes the transmission signal TX with the horizontal synchronization signal HSYNC not only during the data period "data" and the coordinate period "coord" but also during the burst period "burst." In this manner, the sensor control board 131 keeps constant, from one scan period SCAN to another, the variation in the common potential VCOM stemming from the variation in the transmission signal TX during the burst period "burst." The sensor control board 131 thus can reduce the flicker noise (flickering) generated in the image displayed by the display apparatus 10, the flickering being attributable to the variation in the common potential VCOM differing from one scan period SCAN to another during the burst period "burst."

Variations

The present disclosure is not limited to the above-described embodiments. The embodiments above may appropriately be changed in design by those skilled in the art, and such variations also fall within the scope of this disclosure as long as they have what characterizes the disclosure. The constituent elements of the above-described embodiments and those of their variations, to be outlined below, may be combined as needed if it is technically feasible to do so. Such combinations of the constituent elements also fall within the scope of the present disclosure as long as the combinations include what characterizes this disclosure.

For example, although the control circuit 130 in the above embodiments performs the scan process three times in each cycle of the vertical synchronization signal VSYNC, this is not limitative of the present disclosure. Alternatively, the scan process may be carried out as many times as desired per cycle.

In the alternative configuration above, the sensor control board 131 can reduce the noise included in the image displayed by the display apparatus 10A, regardless of how many times the scan process is carried out in each cycle of the vertical synchronization signal VSYNC.

Although the position detector 14 of the above-described embodiments is provided in the display apparatus 10A separate from the display controller 11A, this is not limitative of the present disclosure. Alternatively, part or all of the sensor coil signal lines in the position detector 14 may double as the signal lines of the display controller 11A.

In the alternative configuration above, the display apparatus 10A can occupy a smaller space in reducing the noise included in the image displayed by the display apparatus 10A.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A sensor control board in a display apparatus that includes a display device and a position detector, the display device including a plurality of image elements, the position detector detecting a pointed position on the display device, the sensor control board outputting a transmission signal to the position detector, the sensor control board comprising:
- a clock generation circuit which, in operation, generates a clock signal;
- a phase adjustment circuit which, in operation, adjusts a phase of the clock signal such that the phase is inverted at each predetermined timing and output an adjusted clock signal as the transmission signal to the position detector; and
- an output circuit which, in operation, outputs the clock signal generated by the clock generation circuit to the phase adjustment circuit or stops outputting the clock signal to the phase adjustment circuit,
- wherein the clock generation circuit is connected to the phase adjustment circuit via the output circuit,
- wherein over a plurality of third periods each made up of a first period and a plurality of second periods subsequent to and shorter than the first period, the output circuit outputs the clock signal during the first and the second periods, and
- wherein the predetermined timing is a timing at which each of the third periods is started.

2. The sensor control board according to claim 1, wherein the predetermined timing is a timing at which the output circuit outputs the clock signal to the phase adjustment circuit.

3. The sensor control board according to claim 1, wherein the predetermined timing is a timing synchronized with a vertical synchronization signal generated by the display apparatus or input to the display apparatus from outside of the display apparatus.

4. The sensor control board according to claim 1, wherein the output circuit alternates the clock signal at a timing synchronized with a horizontal synchronization signal generated by the display apparatus or input to the display apparatus from outside of the display apparatus.

5. The sensor control board according to claim 1, wherein the position detector is located in a different layer from a layer where the display device is located.

6. The sensor control board according to claim 1, wherein the plurality of image elements each having a first one end that receives input of a common potential and a second end that receives input of an individual potential.

7. A display apparatus comprising:
- a display device including a plurality of image elements;
- a position detector located either above or below the display device, wherein the position detector, in operation, detects a pointed position on the display device; and
- a sensor control board including:
  - a clock generation circuit which, in operation, generates a clock signal;
  - a phase adjustment circuit which, in operation, adjusts a phase of the clock signal such that the phase is inverted at each predetermined timing, and output an adjusted clock signal as a transmission signal to the position detector; and
  - an output circuit which, in operation, outputs the clock signal generated by the clock generation circuit to the phase adjustment circuit or stops outputting the clock signal to the phase adjustment circuit,
  - wherein the clock generation circuit is connected to the phase adjustment circuit via the output circuit,
  - wherein over a plurality of third periods each made up of a first period and a plurality of second periods subsequent to and shorter than the first period, the output circuit outputs the clock signal during the first and the second periods, and
  - wherein the predetermined timing is a timing at which each of the third periods is started.

8. The display apparatus according to claim 7, further comprising:
- a timing adjustment circuit which, in operation, receives input of a horizontal synchronization signal and outputs the horizontal synchronization signal at a timing at which a potential of the transmission signal either rises or falls; and
- a driver circuit which, in operation, successively drives the plurality of image elements row by row at a timing synchronized with the horizontal synchronization signal output from the timing adjustment circuit.

9. The display apparatus according to claim 8, wherein the timing adjustment circuit, in operation, adjusts a frequency of the horizontal synchronization signal to a frequency different from a multiple of a frequency of the transmission signal, and outputs a frequency-adjusted horizontal synchronization signal at a timing at which the potential of the transmission signal either rises or falls.

10. The display apparatus according to claim 8, wherein the timing adjustment circuit, in operation, adjusts a phase of the horizontal synchronization signal, and outputs a phase-adjusted horizontal synchronization signal at a timing at which the potential of the transmission signal either rises or falls.

11. A control method for a display apparatus including a display device and a position detector, the display device including a plurality of image elements, the position detector being located either above or below the display device and detecting a pointed position on the display device, the control method comprising:
- generating, by a clock generation circuit, a clock signal;
- adjusting, by phase adjustment circuit, a phase of the clock signal such that the phase is inverted at each predetermined timing;
- outputting, by an output circuit, the clock signal generated by the clock generation circuit to the phase adjustment circuit or stop outputting the clock signal to the phase adjustment circuit, wherein the clock generation circuit is connected to the phase adjustment circuit via the output circuit,
- wherein the outputting includes, over a plurality of third periods each made up of a first period and a plurality of second periods subsequent to and shorter than the first period, outputting the clock signal during the first and the second periods, wherein the predetermined timing is a timing at which each of the third periods is started; and
- transmitting a phase-adjusted clock signal as a transmission signal to the position detector.

\* \* \* \* \*